April 26, 1932.　　　M. HAUSER　　　1,855,519
CONDUIT
Filed June 10, 1929
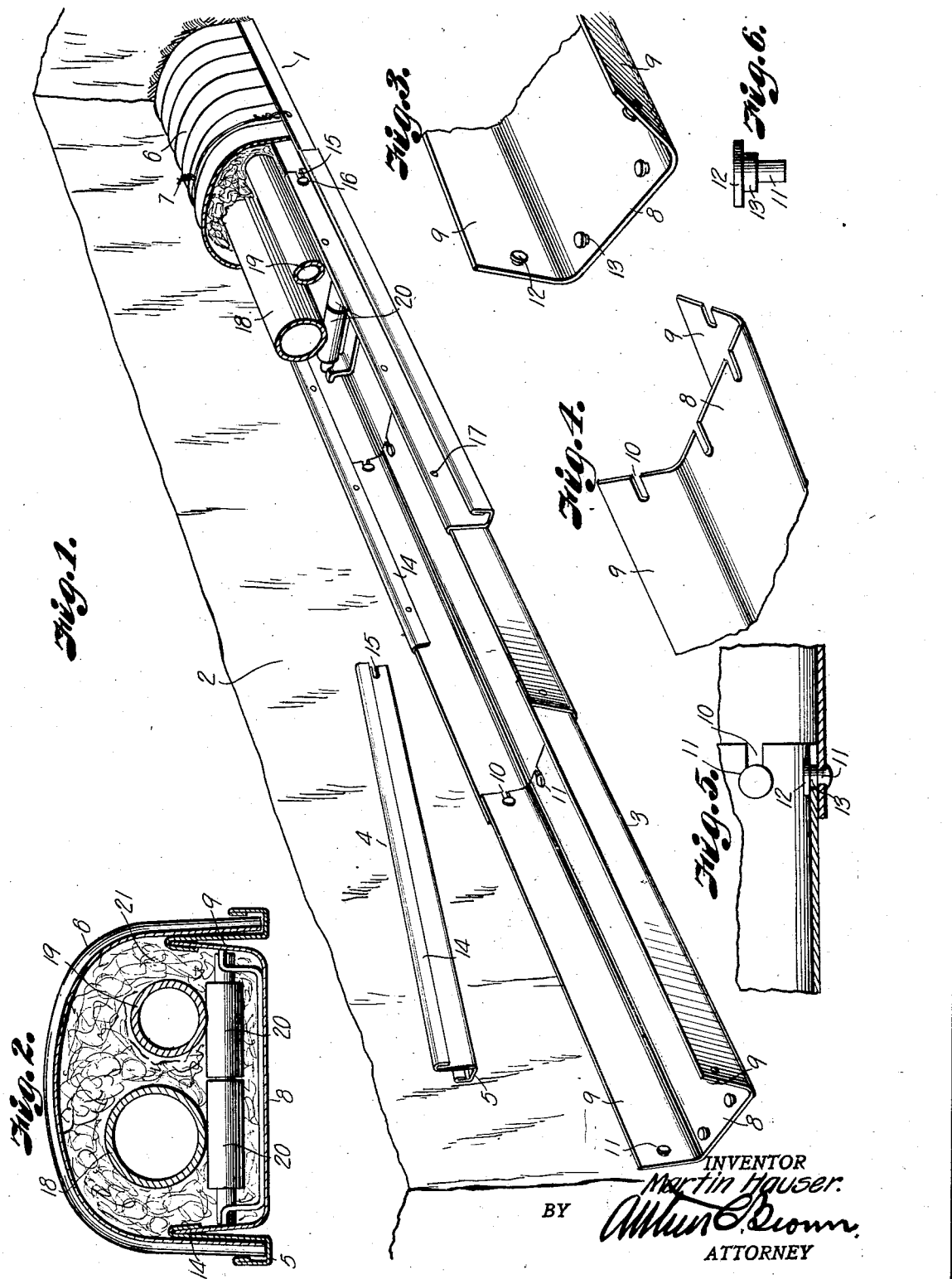
INVENTOR
Martin Hauser.
BY
ATTORNEY Patented Apr. 26, 1932

1,855,519

UNITED STATES PATENT OFFICE

MARTIN HAUSER, OF KANSAS CITY, MISSOURI

CONDUIT

Application filed June 10, 1929. Serial No. 369,895.

My invention relates to pipe casings and more particularly to devices of that character formed of metal trough sections and having flanges extending longitudinally exterior to the trough for supporting an arched cover to comprise a pipe casing, the principal objects of the invention being to facilitate the connection of trough sections and mounting of cover supporting flanges, and to reinforce the connection of trough sections incidentally to mounting the cover-supporting flanges.

In accomplishing these and other objects of the invention, I have provided improved details of structure, the preferred forms of which are illustrated in the accompanying drawings, wherein:

Fig. 1 is a perspective view of portions of a conduit in a trench, a cover-supporting flange member being shown in spaced relation with trough sections on which it is adapted to be mounted.

Fig. 2 is a cross section of the completed conduit with steam pipes and insulation enclosed thereby.

Fig. 3 is an enlarged perspective view of a rivet-equipped end of a trough section.

Fig. 4 is a similar view of the opposite and slotted end of a trough member.

Fig. 5 is a longitudinal section of portions of adjacent interlockingly engaged trough sections, illustrating rivets of one section engaged in slots of the other section.

Referring in detail to the drawings:

1 designates generally a conduit adapted to be erected and installed in a trench 2 and including sheet metal base or trough sections 3 adapted to be arranged longitudinally in the trench in telescoping relation, and bracket-like flange members 4 comprising plates supported by the trough sections and having channel-like outwardly extending seats 5 at their lower edges. An arcuate cover 6 has lower edges mounted in the channel seats and is adapted to be secured to the trough sections by wires 7 attached to the outer flanges of the flange members, all of which will be more particularly described.

The trough sections 3 comprise floors or bottoms 8 and upstanding preferably upwardly diverging walls 9, the floor and wall portions being provided with slots 10 at one end and with rivets 11 at the opposite end spaced similarly to the slots from adjacent longitudinal edges of the floor and side walls to be received by slots of a longitudinally adjacent trough section.

Each rivet 11 includes a head 12 adapted to be spaced from the inner surface of the trough, for example, by a neck 13 integral with the rivet to admit the slotted portion of the adjacent trough section into locking engagement with the rivet, whereby the head tends to latch the slotted end to the adjacent trough section.

The trough sections are thus adapted to telescope partly into one another, the telescoping movement being limited by the depth of the slots and being sufficient to securely anchor one trough section to another.

The flange members include inwardly bent keeper flanges 14 at the inner edges of the members adapted to overlie the upper edges of the trough sections and particularly to overlie the adjacent ends of telescoping trough sections to latch the ends and prevent vertical movement of one trough section in relation to another when the flange members are secured to the trough as presently described.

The flange members are provided with slots 15 at one end, and rivets 16 similar to rivets 11 are mounted in the side walls of the trough sections in spaced relation with the ends thereof having heads spaced from the trough walls by washer-like necks for engagement in the slots of the flange members.

The flange members may thus be easily mounted on the trough walls by moving the slotted end of a flange member into engagement with the rivet and pivoting the flange member until its keeper flange engages the side walls of trough sections. The flange member may then preferably be fixedly secured to the trough by rivets 17 extending through the body portion of the flange member and the side wall of a trough section and also through the keeper flange of the flange member.

Two or more trough sections may be assembled above the ground by engaging the slotted end of one member with the rivets in the end of an adjacent member. A suitable number of cover-supporting brackets or flange members may be mounted on the trough sections, and assembled and fixed thereto by the rivets described, for installing a considerable section made up of elements described in a trench.

A second assembly may be made up and introduced to the trench and the related ends of the first named and second named assemblies may easily be connected by means of the rivets adapted to move into the slotted ends of trough sections and the relatively easily installed flange members.

The trough structure is particularly adapted to receive tubes such as 18 and 19 comprising steam pipes mounted on rollers 20, and insulating material 21 installed to cover the tubes. The insulation will be securely retained by the cover latched by the wire anchored to the flange members.

What I claim and desire to secure by Letters Patent is:

1. In a conduit of the character described including a series of aligned trough sections having upstanding sides, and means for connecting the trough sections, flange brackets including inwardly bent flanges adapted to overlie adjacent ends of trough sections, and means for latching one of said flanged brackets to adjacent trough sections including a rivet projecting laterally from one of said trough sections, said flange bracket having a slot in one end for mounting the end about the rivet.

2. In a conduit of the character described, trough sections in end to end relation comprising bottom portions and side portions at a substantial angle to the bottom portions, one of said portions of each of said sections having a longitudinal slot at one end and a rivet fixed to said portion adjacent the opposite end thereof in alignment with the slot and engageable in the corresponding slot of an adjacent one of said sections, an inwardly projecting keeper head on said rivet, and means including a bracket engageable with the side portions of adjacent sections for latching the sections together.

3. In a conduit of the character described including longitudinally arranged sections forming a trough, a cover, and flange members adapted to support the cover, means for connecting the flange members to the trough including rivets extending laterally outwardly from the trough sections, each flange member having a slot in one end for engaging the flange member with a rivet of one of said trough sections.

4. In a conduit including aligned trough sections having upstanding sides, means for connecting said sections including a side member having an end slot and an edge flange engageable over the sides of aligned sections a rivet in one of said sections engageable in said slot, and means for securing said side member to the other of said sections.

5. A conduit including a pair of aligned sections having upstanding sides and end slots, rivets adjacent the end of one of said sections to engage in said slots in the adjacent end of the other of said sections for latching said sections in overlapping relation, a side member having an end slot and an inbent edge flange forming a hook to engage coincidently over substantially aligned sides of said sections, a rivet in one of said sections engageable in said slot of the side member, and means for securing the side member to the other of said sections.

6. In a conduit, trough sections in end to end telescoping relation and including bottom and side wall portions, adjacent sections having respectively a longitudinal end edge slot and a rivet engageable in the slot upon longitudinal movement of the adjacent sections toward each other into telescoping relation for latching the sections against lateral movement, a bracket having a flange to engage coincidently over adjacent side wall portions of adjacent sections, and means for securing the bracket to said adjacent side wall portions for retaining the latched ends of said sections against vertical movement.

In testimony whereof I affix my signature.

MARTIN HAUSER.